US009061838B2

(12) United States Patent
van de Loecht et al.

(10) Patent No.: US 9,061,838 B2
(45) Date of Patent: Jun. 23, 2015

(54) METHOD FOR OPERATING AN ELECTROMAGNETIC TRANSFER SYSTEM, AND TRANSFER SYSTEM

(75) Inventors: Heinrich van de Loecht, Muggensturm (DE); Martin Reinisch, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 74 days.

(21) Appl. No.: 14/115,382

(22) PCT Filed: Mar. 16, 2012

(86) PCT No.: PCT/EP2012/054725
§ 371 (c)(1),
(2), (4) Date: Feb. 4, 2014

(87) PCT Pub. No.: WO2012/150082
PCT Pub. Date: Nov. 8, 2012

(65) Prior Publication Data
US 2014/0138212 A1 May 22, 2014

(30) Foreign Application Priority Data
May 3, 2011 (DE) .......................... 10 2011 075 176

(51) Int. Cl.
*B65G 47/31* (2006.01)
*B65G 47/84* (2006.01)
(Continued)

(52) U.S. Cl.
CPC .............. *B65G 47/31* (2013.01); *B65G 47/841* (2013.01); *B65G 54/02* (2013.01); *B65G 37/00* (2013.01)

(58) Field of Classification Search
USPC ............. 198/440, 459.1, 459.5, 461.1, 461.2, 198/462.1, 469.1, 617, 619, 717, 728, 729, 198/805
See application file for complete search history.

(56) References Cited

U.S. PATENT DOCUMENTS 3,902,587 A * 9/1975 Checcucci .................. 198/419.3
4,337,856 A * 7/1982 Dorner .......................... 198/599
(Continued)

FOREIGN PATENT DOCUMENTS

DE  102009029314  8/2010
EP  1123886  8/2001
(Continued)

OTHER PUBLICATIONS

International Search Report for Application No. PCT/EP2012/054725 dated Jun. 15, 2012 (2 pages).

*Primary Examiner* — Douglas Hess
(74) *Attorney, Agent, or Firm* — Michael Best & Friedrich LLP

(57) ABSTRACT

The invention relates to a method for operating an electromagnetic transfer system (10) which is used to convey items (1; 1a) to a downstream conveyor device (15), and which comprises a carrier path (20), preferably designed to be closed, on which there is at least one moveable transport element (22) for an item (1; 1a) that is moved along on a transport surface (24) by said transport element (22), said transport element (22) having at least one permanent magnet element (32) that is arranged to be functionally connected to individually-energisable inductor coils (31) which are arranged along the carrier path (20). Position-detecting means (35) are provided to ascertain the position of the transport element (22) on said carrier path (20) and, in a delivery region (37), the item (1; 1a) is delivered from the transport surface (24) to the downstream conveyor device (15), said conveyor device having a separate drive (38). According to the invention, in order to reduce the spacing (A, $A_1$, $A_2$) between individual items (1; 1a) on the downstream conveyor device (15), the conveyor speed ($v_4$) of said conveyor device (15) is reduced intermittently at the point of delivery from the transport surface (24) to the conveyor device (15), in relation to the speed ($v_2$) of the transport element (22), and/or the speed ($v_2$) of the transport element (22) is increased at the point of delivery in relation to the conveyor speed ($v_4$) of the conveyor device (15).

13 Claims, 3 Drawing Sheets

(51) Int. Cl.
*B65G 54/02* (2006.01)
*B65G 37/00* (2006.01)

(56) References Cited

U.S. PATENT DOCUMENTS

| | | | |
|---|---|---|---|
| 5,035,315 A * | 7/1991 | Fukusaki et al. | 198/419.2 |
| 5,067,607 A * | 11/1991 | Mizuta et al. | 198/733 |
| 5,147,029 A * | 9/1992 | Wadell | 198/619 |
| 5,560,184 A * | 10/1996 | Tisma | 53/531 |
| 5,740,902 A * | 4/1998 | Spatafora | 198/459.2 |
| 6,662,933 B2 * | 12/2003 | De Guglielmo et al. | 198/732 |
| 6,876,107 B2 | 4/2005 | Jacobs | |
| 6,876,896 B1 * | 4/2005 | Ortiz et al. | 700/112 |
| 7,542,823 B2 * | 6/2009 | Nagai | 700/230 |
| 7,775,344 B2 * | 8/2010 | Balk | 198/778 |
| 8,096,409 B2 * | 1/2012 | Wipf et al. | 198/805 |
| 8,100,253 B2 * | 1/2012 | Walsh | 198/476.1 |
| 8,397,896 B2 * | 3/2013 | Kleinikkink et al. | 198/345.3 |
| 8,776,985 B2 * | 7/2014 | Huettner et al. | 198/459.8 |
| 8,827,071 B2 * | 9/2014 | van de Loecht | 198/805 |
| 2010/0084247 A1 | 4/2010 | Wipf et al. | |

FOREIGN PATENT DOCUMENTS

| | | |
|---|---|---|
| EP | 1300351 | 4/2003 |
| WO | 9850760 | 11/1998 |
| WO | 2010085670 | 7/2010 |

* cited by examiner

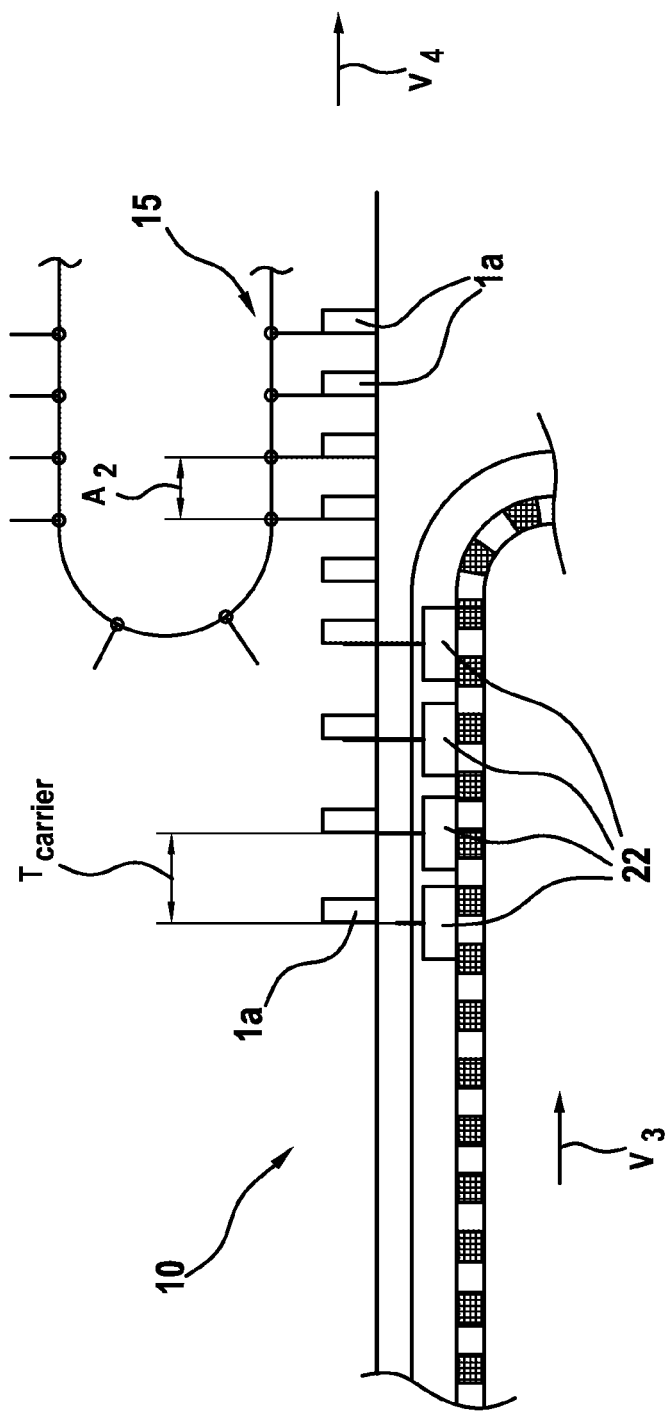

METHOD FOR OPERATING AN ELECTROMAGNETIC TRANSFER SYSTEM, AND TRANSFER SYSTEM

BACKGROUND OF THE INVENTION

The invention relates to a method for operating an electromagnetic transfer system and to a transfer system.

A method for operating an electromagnetic transfer system is known from U.S. Pat. No. 6,876,107 B2. A transfer system is thereby disclosed, for example, in FIG. 5 in which a plurality of electromagnetically movable transport elements that can be individually actuated and moved is arranged on a carrier path. Such a transfer system serves, for example, to take over items, which are typically conveyed on a feeder device spaced apart at varying distances from one other, by means of the individual transport elements, to guide the items along a transport route and deliver said items to a downstream conveyor device spaced at defined distances from one another. The transport elements used in such transfer systems have a certain overall length in the direction of movement thereof on the carrier path. In the case of items which have an extension or, respectively, dimension in the direction of transportation of the transport elements, which corresponds to the overall length of the transport element, it is thereby possible to deliver said items, which enter into the region of the transfer system via the feeder device spaced apart at relatively large distances from one another, to the downstream conveyor device at a spacing which is significantly less than that of the incoming items. In the case of items which have a length in the direction of transportation in the transfer system that is greater than the length of the transport element, it is theoretically possible for the items to be subsequently delivered in a contiguous manner to the downstream conveyor device.

Applications in which the items have a dimension in their direction of transportation in the transfer system that is significantly less than the overall length of the transport element can, however, present a problem. Because in extreme cases the transport elements can only be directly contiguous to one another in the delivery region of the transfer system, a distance therefore remains between the individual items in the transport elements which results from the difference in length between the transport elements and the item or items in the direction of transportation. Using the device disclosed by U.S. Pat. No. 6,876,107 B2 or the operating method thereof, it is therefore not possible to deliver items, which have a dimension or, respectively, length in the direction of transportation that is less than that of the transport element, to the downstream conveyor device so as to be spaced apart at a distance which is less than the difference between the length of the transport element and the items.

SUMMARY OF THE INVENTION

Based on the prior art described above, it is the aim of the invention to further develop a method for operating an electromagnetic transfer system in such a way that the items can be delivered by means of the transport elements to a downstream conveyor device such that said items can there be mutually spaced apart from one another at a distance which is less than the difference between the length of a transport element and that of the items. This aim is met by a method for operating an electromagnetic transfer system according to the invention. The concept underlying the invention is therefore to vary the feed rate of the downstream conveyor device or the conveyance speed of the transport element on the carrier path in the delivery area such that virtually an excess speed of the items results at the delivery point from the transfer system to the downstream conveyor device; thus enabling the items to be delivered to said downstream conveyor device spaced apart at a distance which is less than the length of the conveyor element in the direction of transportation.

Advantageous modifications to the inventive method for operating an electromagnetic transfer system are specified in the dependent claims. All combinations consisting of at least two of the features disclosed in the claims, the description and/or the figures fall within the scope of the invention.

In order to reduce the mechanical stresses on the transport element as well as in particular on the items, it is proposed in a particularly preferred variant of the method that the speed of the transport element be increased along a path section before the delivery region. It is therefore possible to continuously increase the speed of the conveyor element up until the delivery point; thus enabling a transport to occur in a product-protective manner.

In order to facilitate a highest possible performance of the transport system, it is necessary and/or useful to dispose or, respectively, drive a plurality of transport elements along the carrier path. In order to maximize the performance in such an arrangement of a plurality of transport elements, it is furthermore proposed that the spacing between said transport elements be reduced to a minimum distance in a region upstream of the delivery region.

A transport system for carrying out a method according to the invention is characterized in that a control device is provided, which actuates the drive of the at least one transport element or the conveyor device such that the item moves in the delivery region with excess speed to the (downstream) conveyor device.

A particularly simple mechanical construction or design of the transport elements is made possible if the delivery region of the items into the (downstream) conveyor device is situated in a curve entry region of the transport path. Due to the design of the transport path, the transport element can in this case be pivoted out of the further conveyance path of the item so that said transport element does not present an obstacle in particular to a successive item.

BRIEF DESCRIPTION OF THE DRAWINGS

Further advantages, features and details of the invention ensue from the following description of preferred exemplary embodiments as well as with the aid of the drawings.

In the drawings:

FIG. 3 shows the section pursuant to FIG. 2 in which the transport elements of the transfer system are driven according to the inventive method.

DETAILED DESCRIPTION

Figure 1:
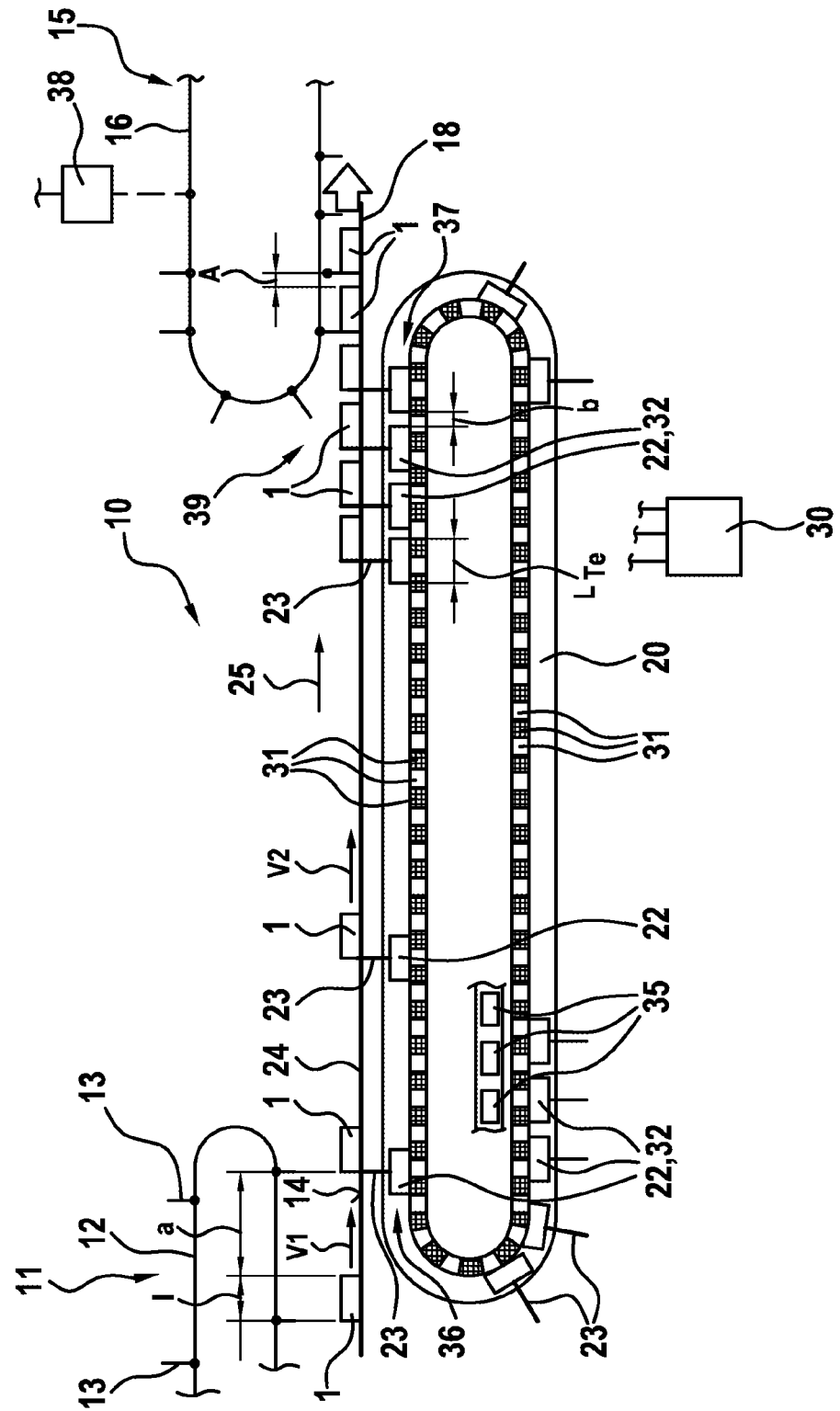
FIG. 1 shows a greatly simplified depiction of a transfer system for items.

Identical components or components having the same function are provided with the same reference numerals.

In FIG. 1, a transfer system 10 for conveying items 1 or, respectively, products is depicted. The items 1 are only symbolically depicted in the figures. Said items 1 can relate, for example, to packagings which, for example, are filled with chocolate bars, cookies or the like or else to other items which are to be packaged by means of a packaging machine located immediately downstream of the transfer system 10.

The items 1 are conveyed to the region of the transfer system 10 by means of a feeder device 11, which is not shown here in detail. The feeder device 11 can, for example, relate to a packaged goods chain conveyor 12 comprising driver elements 13 which are fastened to the packaged goods chain conveyor 12 at equal distances from one another. The spacing a between two items 1 in the region of the feeder device 11 results therefore from the difference in length between the distance between two driver elements 13 and the length l of an item 1. The items 1 are conveyed continuously or in a clocked manner along a preferably planar transport surface 14, e.g. in the form of a sliding plate 24. It also, of course, lies within the scope of the invention for the feeder device (11) to be designed as a simple (conveyor) belt, on which the items 1 are conveyed spaced apart from one another at non-uniform distances a; and therefore no driver elements 13 or something similar have to be provided.

By means of the transfer system 10, items 1 are taken from the feeder device 11 and delivered to a conveyor device 15 downstream of said transfer system 10. The conveyor device 15 is likewise designed in the depicted exemplary embodiment as a packaged goods chain conveyor 16 comprising driver elements 17. The items 1 also slide along on a planar transport surface 18 in the region of the downstream conveyor device 15. It also lies within the scope the invention for the items 1 to be directly inserted from the transfer system 10 into a packing material tube which is subsequently sealed and divided up to form bag packagings therefrom.

The transfer system 10 is designed as a so-called electromagnetic transfer system 10. For that reason, the transfer system 10 comprises a closed carrier path 20, which is oval shaped in the exemplary embodiment, for at least one, preferably, however, a plurality of transport elements 22. Each of the transport elements 22, which are of identical design, has a driver element 23 which, in order to transport an item 1 on the sliding plate 24, comes into abutting contact with the respective item 1 and conveys or transports the same in the direction of transportation.

A plurality of inductor coils 31 which can be individually energized by means of a control device 30 is disposed in the region of the carrier path 20. The inductor coils 31 interact with at least one permanent magnet element 32 which is disposed on the transport element 22 and is not depicted in detail in FIG. 1. The movement of the transport element 22 along the carrier path 20 results from energizing the individual inductor coils 31 along the carrier path 20 such that the respective inductor coil 31 exerts an attractive or repulsive force on the respective permanent magnet element 32 on the transport element 22 and in so doing moves the transport element 22 in a desired manner using any desired speed profiles.

In addition, position detecting means 35 are disposed along the carrier path 20, said means ascertaining the respective position of the transport element 22 along the carrier path 22 and providing the same to the control device 30 as the input value. On the basis of the respective position of the transport elements 22, said elements are individually actuated or, respectively, moved by means of the control device 30.

The take-over of the items 1 from the feeder device 11 takes place in a curve exit region 36 of the carrier path 20, wherein the driver elements 23 of the transport elements 22 engage, for example, in a longitudinal slot of the sliding plate 24 and thereby enter into functional connection with the respective item 1 and then push the same in front of themselves. The delivery of the items 1 to the downstream conveyor device 15 takes place in a curve entry region 37 of the carrier path 20, the driver elements 23 of the transport elements 22 dipping progressively into the aforementioned longitudinal slot of the sliding plate 24 and therefore moving out of functional connection with the items 1.

The downstream conveyor device 15 has a drive 38, the rotational speed of which or, respectively, conveyor speed of said conveyor device 15 being supplied to the control device 30 of the transfer system 10 as the input value.

The case is depicted in FIG. 1, in which the length l of an item 1 in the direction of transportation thereof is approximately equally long as the length $L_{Te}$ of a transport element 22 in the direction of transportation. By means of the transfer system 10, an item 1 from the feeder device 11 is taken over by a transport element 22 and delivered to the downstream conveyor device 15. In this instance, the spacing A between the items 1 in the region of the downstream conveyor device 15 is less than the spacing a between the items 1 in the region of the feeder device 11. In order to reduce the spacing between the individual items 1 in a desired manner between the feeder device 11 and the downstream conveyor device 15, the items 1 are moved in an accelerated manner on the sliding plate 24 by means of the respective transport element 22, i.e. the speed $v_2$ for the item 1 in the region of the transfer device 10 is greater than the speed $v_1$ in the region of the feeder device 11.

The individual transport elements 22 have a spacing b between one another, which corresponds to the minimum spacing of the transport elements 22 from one another, already in a region 39 on the sliding plate 24, which lies upstream of the delivery region of the items 1 to the downstream conveyor device 15 in the curve entry region 37. Said minimum spacing b is, for example, required for safety reasons in order to prevent collisions between the individual transport elements 22 or in order to be able to move the individual transport elements 22 as desired in a controlled manner by means of the aforementioned actuation or, respectively, energizing of the inductor coils 31.

By virtue of the fact that the length l of the items 1 in the exemplary embodiment depicted in FIG. 1 corresponds approximately to the length $L_{Te}$ of the transport elements 22, the spacing between the items 1 in the region of the transfer system 10 can be reduced in a desired manner for delivery of said items 1 to the downstream conveyor device 15.

Figure 2:
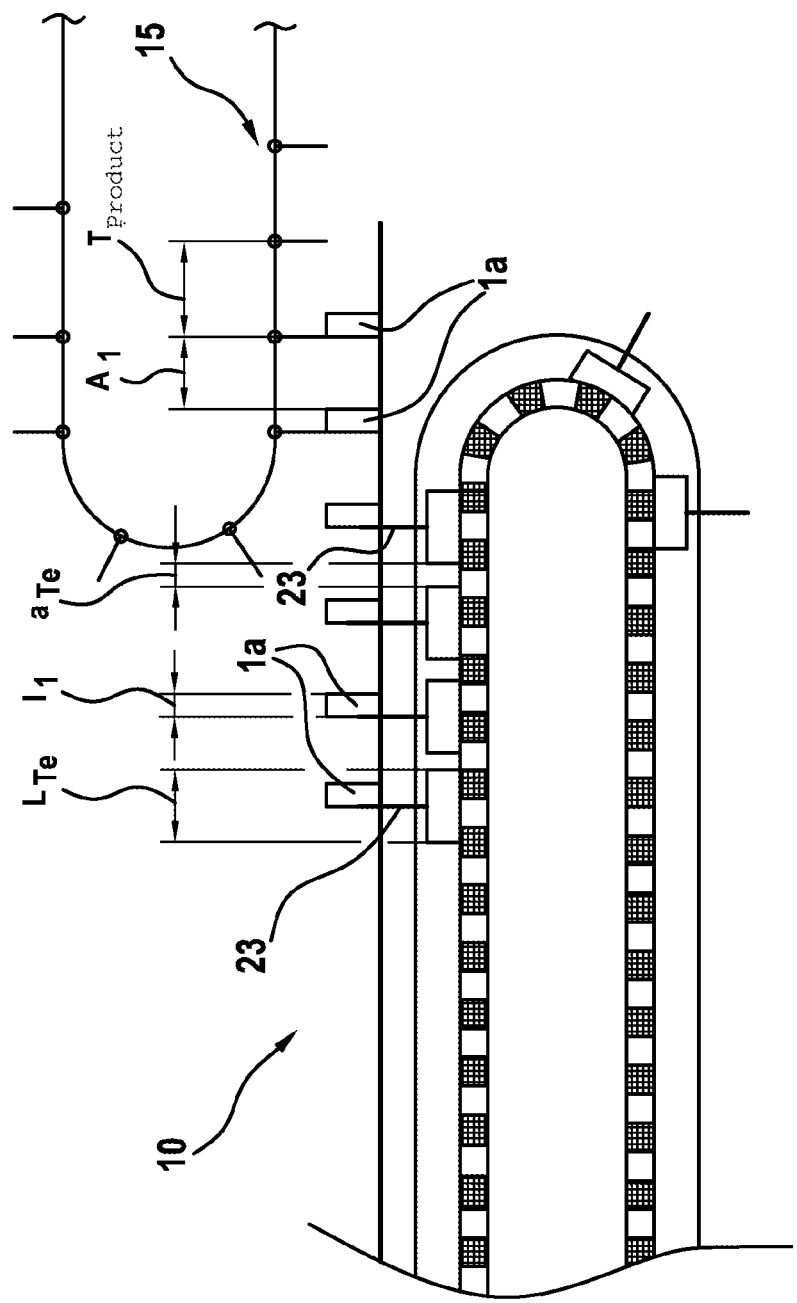
FIG. 2 shows a partial section of the transfer system pursuant to FIG. 1, wherein compared to FIG. 1, items are transported which have a significantly smaller dimension or length in the direction of transportation.

In FIG. 2, a partial section of the transfer system 10 is depicted in the region, in which the items 1a are delivered to the downstream conveyor device 15. It is important here for the items 1a in contrast to the items 1 of FIG. 1 to have a length $l_1$ which is significantly less than the length l of the items 1. The length $l_1$ of the items 1a is in particular significantly less than the length $L_{Te}$ of a transport element 22.

It can be seen with the aid of FIG. 1 that the spacing $A_1$ between two items 1a in the region of the downstream conveyor device 15 cannot be less than the distance of two driver elements 23 from two transport elements 22, reduced by the length $l_1$ of an item 1a.

In FIG. 3, the transfer system 10 is in contrast depicted while said system is being operated according to the invention. It can particularly be seen that the spacing $A_2$ between two items 1a in the region of the downstream conveyor device 15 is less than the spacing $A_1$ between two items 1a in the region of the transfer system 10, said spacing $A_1$ being mentioned previously in relation to FIG. 2. This is thereby achieved by the fact that the transport elements 22 or, respectively, the items 1a are accelerated to a speed $v_3$, which is greater than the speed $v_4$ of the downstream conveyor device 15, at the latest in the delivery region or more precisely at the delivery point of the transport elements 22 to the downstream conveyor device 15, preferably, however, already on a section of the conveyor path upstream thereof. That means that the items 1a are channeled into the region of the downstream conveyor device 15 at an excess speed Δv.

In this context, the required speed $v_{Te}$ of the transport element 22 can be calculated at the delivery point to achieve a certain spacing A in the region of the conveyor device 15 according to the following formula:

$$v_{Te}=(L_{Te}+a_{Te})/A$$

wherein $L_{Te}$ represents the overall length of the transport element 22, $a_{Te}$ the minimum spacing between two transport elements 22 in the delivery region and A the spacing between two items 1 on the conveyor device 15.

As an alternative thereto, it would also be conceivable that at the respective delivery point of an item 1a from the transport element 22 to the downstream conveyor device 15, the drive 38 of the conveyor device 15 reduces the speed $v_4$ to a value which is less than the speed $v_3$ of the relevant transport element 22 in the delivery region or more precisely at the delivery point. It is furthermore also conceivable for both measures provided in accordance with the method, i.e. the acceleration of the conveyor element 22 as well as the intermittent delay of the downstream conveyor device 15, to be combined with each other.

In principle, it is also possible by means of the method according to the invention to reduce the spacing $A_1$, $A_2$ between items 1 in the downstream conveyor device 15, to a desired dimension, theoretically up until two items 1a directly abut on each other.

The transfer system 10 described above can be altered, respectively modified, in numerous ways without deviating from the inventive concept.

The invention claimed is:

1. A method for operating an electromagnetic transfer system (10) used to convey items (1: 1a) to a downstream conveyor device (15), the system comprising a carrier path (20), on which there is at least one movable transport element (22) for an item (1; 1a) that is moved along on a transport surface (24) by said transport element (22), said transport element (22) having at least one permanent magnet element (32) that is arranged to be functionally connected to individually-energizable inductor coils (31) which are arranged along the carrier path (20), wherein position-detecting means (35) for ascertaining a position of the transport element (22) are provided on said carrier path (20) and, in a delivery region (37), the item (1; 1a) is delivered from the transport surface (24) to the downstream conveyor device (15), said conveyor device having a separate drive (38), the method comprising, in order to reduce spacing (A, A1, A2) between individual items (1; 1a) on the downstream conveyor device (15), at least one of the following steps: (A) a conveyor speed (v4) of said conveyor device (15) is reduced intermittently at a point of delivery from the transport surface (24) to the conveyor device (15) in relation to a speed (v2) of the transport element (22); and (B) the speed (v2) of the transport element (22) is increased at the point of delivery in relation to the conveyor speed (v4) of the conveyor device (15).

2. The method according to claim 1, characterized in that the speed (v2) of the transport element (22) is already increased along a path section upstream of the delivery point.

3. The method according to claim 1, characterized in that a plurality of transport elements (22) is provided, a spacing between which is reduced in a region upstream of the delivery point to a minimum spacing (aTe) between the transport elements (22).

4. The method according to claim 3, characterized in that the speed of the transport element is calculated according to the formula $$V(Te)=(LTe+aTe)/TA$$

wherein LTe represents an overall length of the transport element (22), wherein aTe represents a minimum spacing between two transport elements (22) in the delivery region and wherein TA represents the spacing between two items (1; 1a) on the conveyor device (15).

5. The method according to claim 1, characterized in that the items (1; 1a) are taken over from a feeder device (11) by means of the at least one transport element (22) and in that the at least one transport element (22) is continuously driven at a constant speed except for, if need be, the speed being intermittently reduced to take over the items (1; 1a) from the feeder device (11).

6. The method according to claim 1, characterized in that the items (1; 1a) are pushed along on the transport surface (24) by the transport element (22).

7. A transfer system (10) for carrying out a method according to claim 1, characterized in that a control device (30) is provided which actuates the at least one transport element (22) or the conveyor device (15) in such a manner that the item (1; 1a) moves into the conveyor unit (15) with excess speed at the delivery point of said item (1; 1a) to said conveyor unit (15).

8. The transfer system according to claim 7, characterized in that a delivery region of the items (1; 1a) is situated in a direction of transportation (15) in a curve entry region (37) of the transport path (20).

9. The transfer system according to claim 7, characterized in that a take-over region of the items (1; 1a) coming from a feeder device (11) is situated in a curve exit region (36) of the transport path (20).

10. The transfer system according to claim 7, characterized in that the transport element (22) comprises a driver element (23) which abuts on the item (1; 1a) so as to be able to push the same.

11. A method for operating an electromagnetic transfer system (10) used to convey items (1: 1a) to a downstream conveyor device (15), the system comprising a carrier path (20), on which there is at least one movable transport element (22) for an item (1; 1a) that is moved along on a transport surface (24) by said transport element (22), said transport element (22) having at least one permanent magnet element (32) that is arranged to be functionally connected to individually-energizable inductor coils (31) which are arranged along the carrier path (20), wherein position-detecting means (35) for ascertaining a position of the transport element (22) are provided on said carrier path (20) and, in a delivery region (37), the item (1; 1a) is delivered from the transport surface (24) to the downstream conveyor device (15), said conveyor device having a separate drive (38), the method comprising, in order to reduce spacing (A, A1, A2) between individual items (1; 1a) on the downstream conveyor device (15), a conveyor speed (v4) of said conveyor device (15) is reduced intermittently at a point of delivery from the transport surface (24) to the conveyor device (15) in relation to a speed (v2) of the transport element (22).

12. The method of claim 11 and further comprising the speed (v2) of the transport element (22) is increased at the point of delivery in relation to the conveyor speed (v4) of the conveyor device (15).

13. A method for operating an electromagnetic transfer system (10) used to convey items (1: 1a) to a downstream conveyor device (15), the system comprising a carrier path (20), on which there is at least one movable transport element (22) for an item (1; 1a) that is moved along on a transport surface (24) by said transport element (22), said transport element (22) having at least one permanent magnet element (32) that is arranged to be functionally connected to individually-energizable inductor coils (31) which are arranged along the carrier path (20), wherein position-detecting means (35) for ascertaining a position of the transport element (22) are provided on said carrier path (20) and, in a delivery region (37), the item (1; 1a) is delivered from the transport surface (24) to the downstream conveyor device (15), said conveyor device having a separate drive (38), the method comprising, in order to reduce spacing (A, A1, A2) between individual items (1; 1a) on the downstream conveyor device (15), the speed (v2) of the transport element (22) is increased at the point of delivery in relation to the conveyor speed (v4) of the conveyor device (15).

\* \* \* \* \*